United States Patent [19]
Nickey et al.

[11] Patent Number: 5,415,721
[45] Date of Patent: May 16, 1995

[54] APPARATUS FOR FORMING AND APPLYING A SHRINKABLE SLEEVE ON A CONTAINER

[75] Inventors: George A. Nickey, Maumee; Russell W. Heckman, Perrysburg; Robert C. Miller, Whitehouse; Walter E. Traxler, Toledo, all of Ohio

[73] Assignee: Owens-Brockway Glass Container Inc., Toledo, Ohio

[21] Appl. No.: 95,503

[22] Filed: Jul. 22, 1993

[51] Int. Cl.$^6$ .................................................. B65C 3/08
[52] U.S. Cl. .................................... 156/447; 156/446; 156/458
[58] Field of Search .................... 156/85, 86, 446, 447, 156/458

[56] References Cited

U.S. PATENT DOCUMENTS

| | | | |
|---|---|---|---|
| 3,767,496 | 10/1973 | Amberg et al. | 156/86 |
| 3,802,942 | 4/1974 | Amberg et al. | 156/443 |
| 3,843,316 | 10/1974 | Amberg et al. | 432/124 |
| 3,959,065 | 5/1976 | Ashcroft | 156/423 |
| 4,285,750 | 8/1981 | DeMartino | 156/218 |
| 4,302,275 | 11/1981 | Burmeister et al. | 156/446 |
| 4,366,016 | 12/1982 | Golden, Jr. | 156/218 |
| 4,444,613 | 4/1984 | Burmeister | 156/446 |
| 4,496,409 | 1/1985 | Kontz | 156/85 |
| 4,555,296 | 11/1985 | Burtch et al. | 156/446 |

*Primary Examiner*—Michael W. Ball
*Assistant Examiner*—Richard Crispino

[57] ABSTRACT

A method and apparatus for forming a shrinkable sleeve of plastic material and applying it as a label to a glass or plastic container. The plastic is fed from a source, cut to successive lengths, wrapped about successive mandrels and sealed to form each sleeve. Thereafter each sleeve is transferred from the mandrel onto an overlying container. The mandrels are circumferentially positioned on a turret, and a combined heat seal bar and tucker bar is associated with each mandrel to bond the overlapping ends of the severed length of plastic material to one another. A stripper transfers each sleeve that has been so formed from a position on the mandrel axially onto an overlying aligned container while the path of the container overlies the respective mandrel for a portion of its movement by the turret.

32 Claims, 20 Drawing Sheets

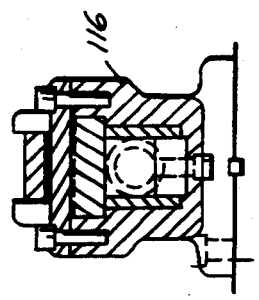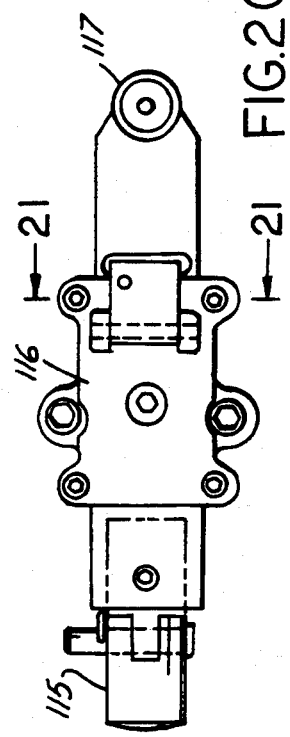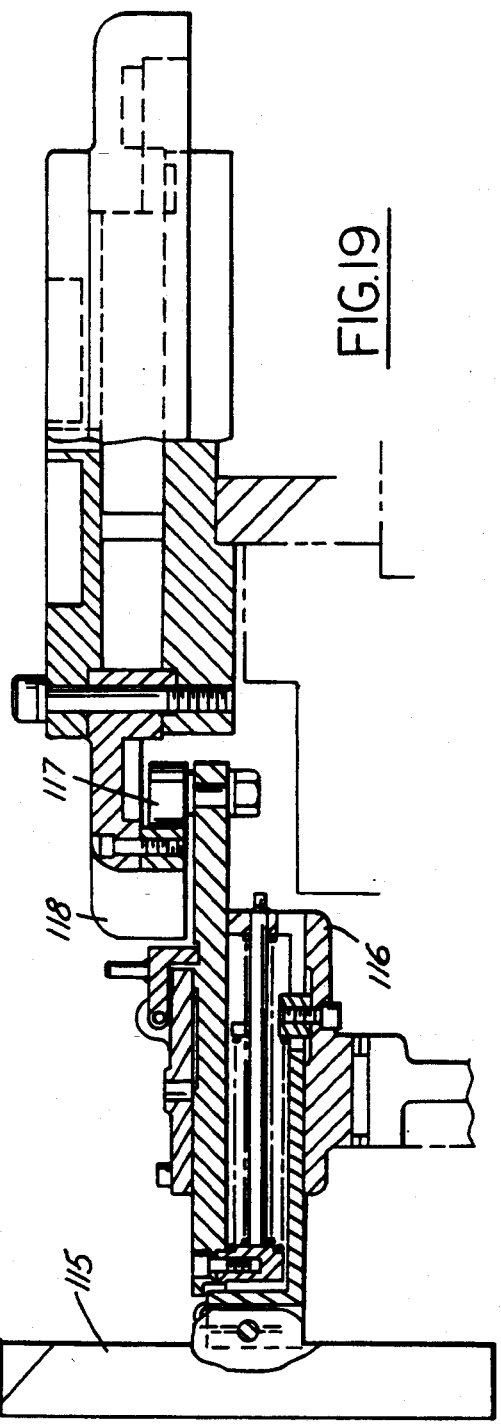

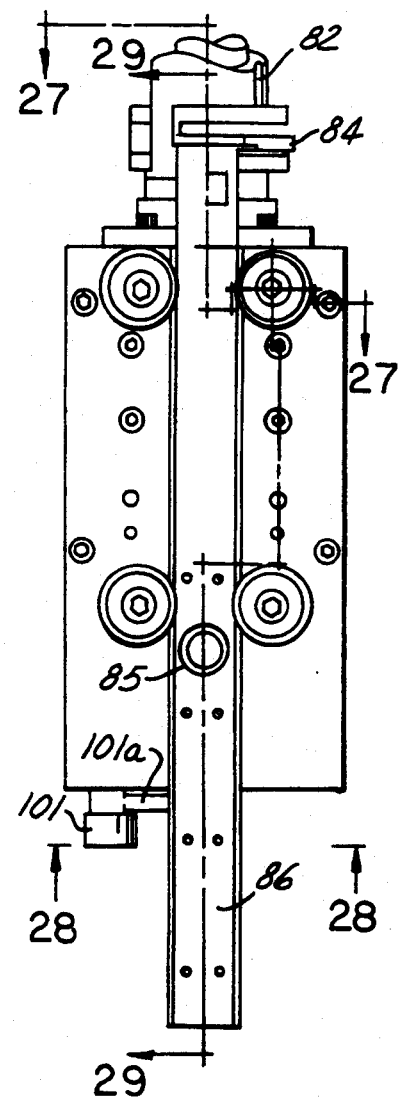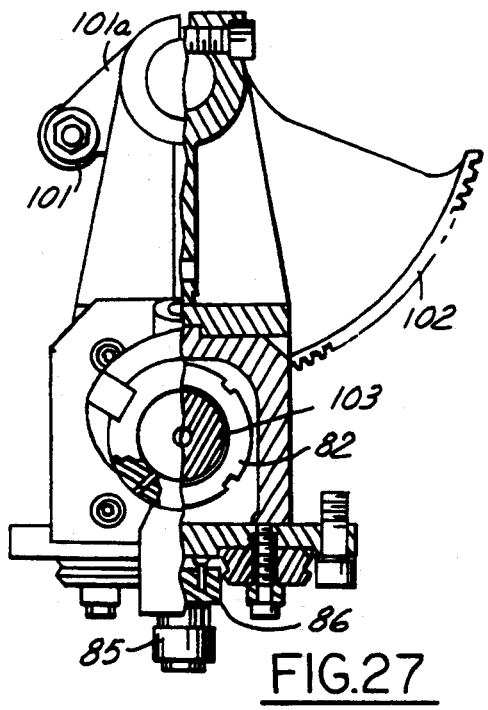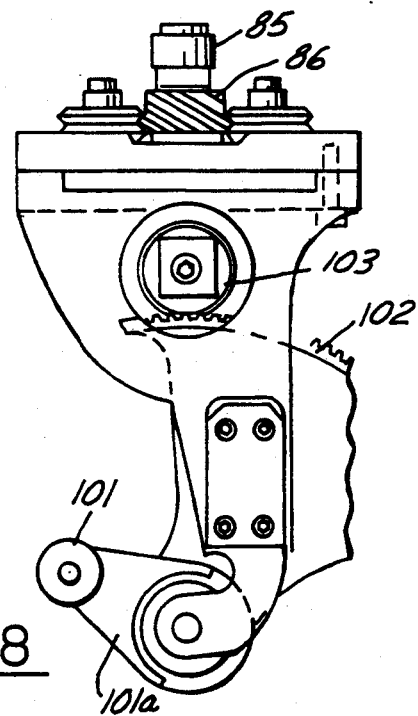
FIG.26
FIG.27
FIG.28

APPARATUS FOR FORMING AND APPLYING A SHRINKABLE SLEEVE ON A CONTAINER

This invention relates to a method and apparatus for forming a sleeve of shrinkable plastic material and applying it to a container such as a glass or plastic container.

BACKGROUND AND SUMMARY OF THE INVENTION

One heretofore known method for applying a label to a container comprises wrapping a length of plastic material about the container, bonding the overlapped ends of the length of material, and thereafter shrinking the sleeve that has been formed. This technique is illustrated, for example, in U.S. Pat. Nos. 4,567,681, 4,574,020 and 4,662,965. In another method, a separate sleeve is first formed and then transferred onto the container. The container with the sleeve is then heated to shrink the sleeve about the container. In these methods, the overlapped ends are bonded by heat fusing, solvent or adhesive. The sleeve technique is illustrated, for example, in U.S. Pat. Nos. 3,843,316, 3,959,065, 4,444,613 and 4,496,409.

Among the objectives of the present invention are to provide an improved method and apparatus for forming a shrinkable sleeve and applying it to a container by heat sealing wherein the method and apparatus comprise improved steps and apparatus for forming the sleeve about a mandrel and for transferring the sleeve from a forming mandrel onto a container; wherein the apparatus will handle thin and flexible materials at high speeds; and wherein the transfer of the sleeve to the container occurs over a short overlapping path of the mandrel and container, thereby permitting the sleeve forming portion of the apparatus to be used more efficiently for forming sleeves at high speeds.

In accordance with the invention, a method and apparatus are provided for forming a shrinkable sleeve of plastic material and applying it as a label to a glass or plastic container. The plastic is fed from a source, cut to successive lengths, wrapped about successive mandrels and sealed to form the sleeve. Thereafter, each sleeve is moved from its associated mandrel onto an overlying container. The mandrels are circumferentially positioned on a turret, and a combined heat seal bar and tucker bar assembly is associated with each mandrel to bond the overlapping ends of each severed length of plastic material to one another. A stripper transfers each sleeve that has been so formed from a position on its mandrel axially onto an overlying container while the path of the container overlies the respective mandrel for a portion of its movement by the turret.

DESCRIPTION OF THE DRAWINGS

FIG. 19 is a fragmentary sectional view taken along the line 19—19 in FIG. 18.

FIG. 20 is a fragmentary part sectional plan view of the apparatus shown in FIG. 18.

FIG. 21 is a view taken along the line 21—21 in FIG. 20.

FIG. 26 is a fragmentary sectional view taken along the line 26—26 in FIG. 22.

FIG. 27 is a sectional view taken along the line 27—27 in FIG. 26.

FIG. 28 is a sectional view taken along the line 28—28 in FIG. 26.

DESCRIPTION

The present invention is directed to improvements in the methods and apparatus disclosed in above-noted U.S. Pat. Nos. 3,843,316, 3,959,065, 4,444,613 and 4,496,409, the disclosures of which are incorporated herein by reference for purposes of background.

Figure 1:
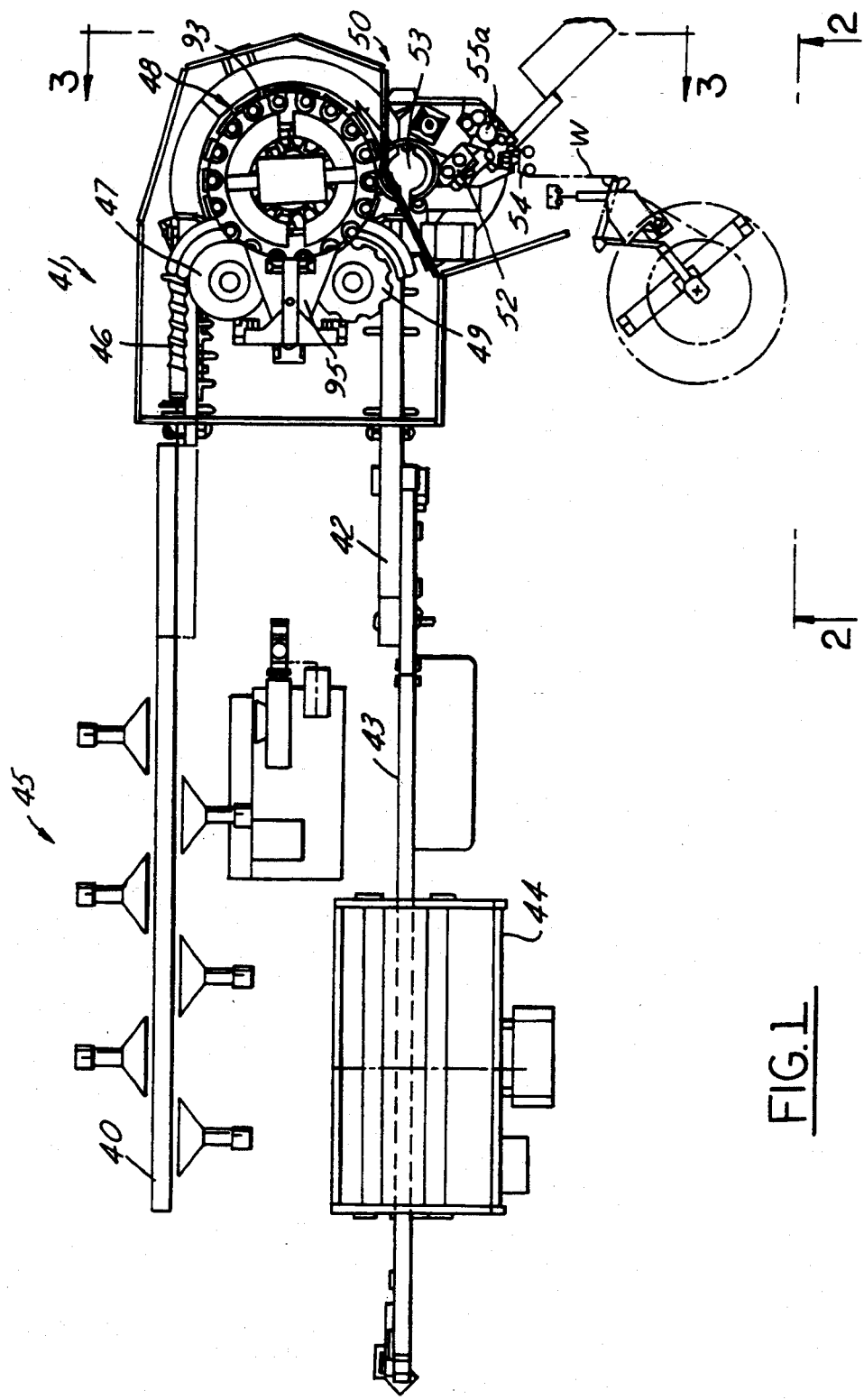
FIG. 1 is a plan view of an apparatus embodying the invention.
Figure 2:
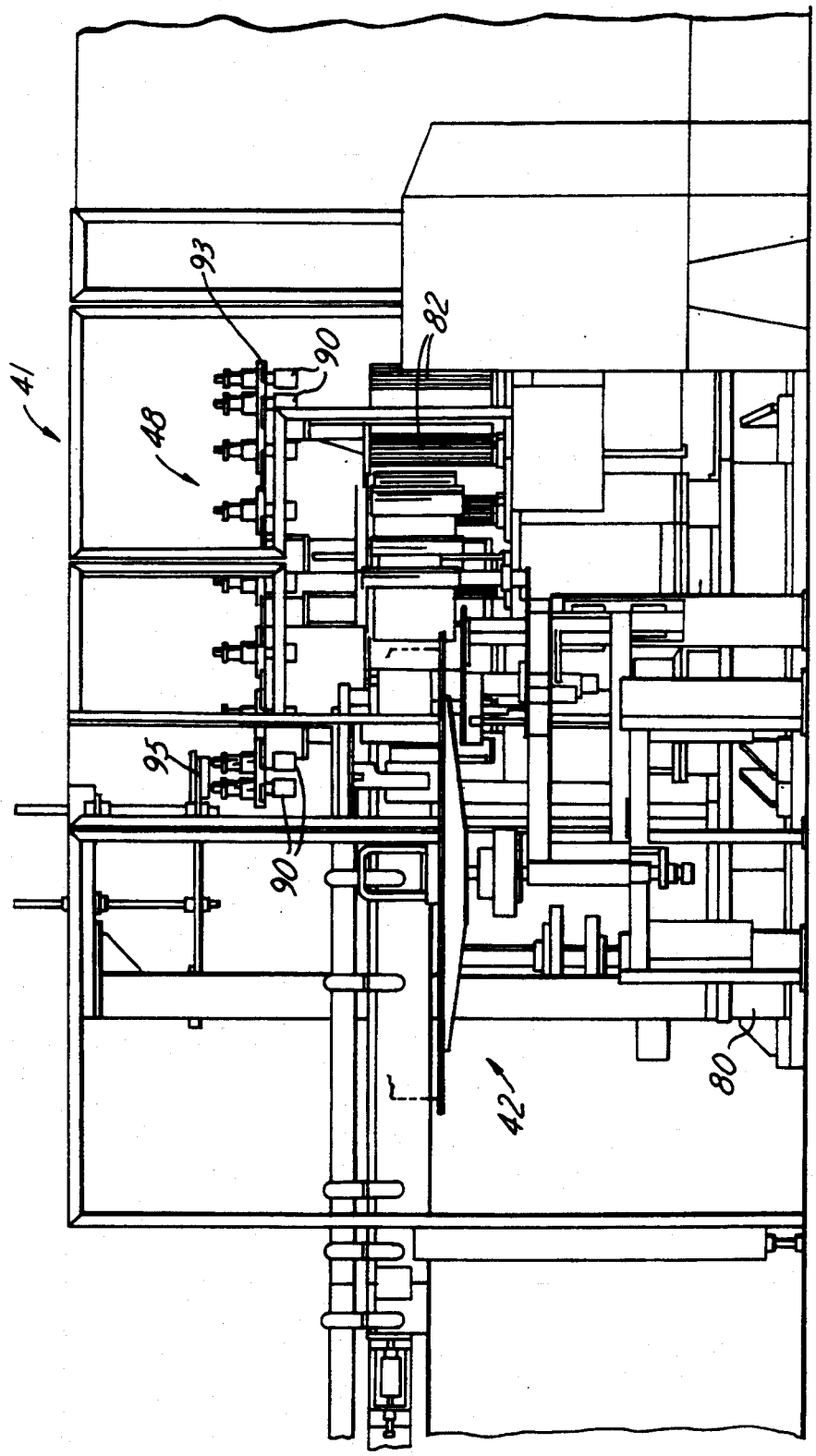
FIG. 2 is a fragmentary elevational view taken along the line 2—2 in FIG. 1.
Figure 3:
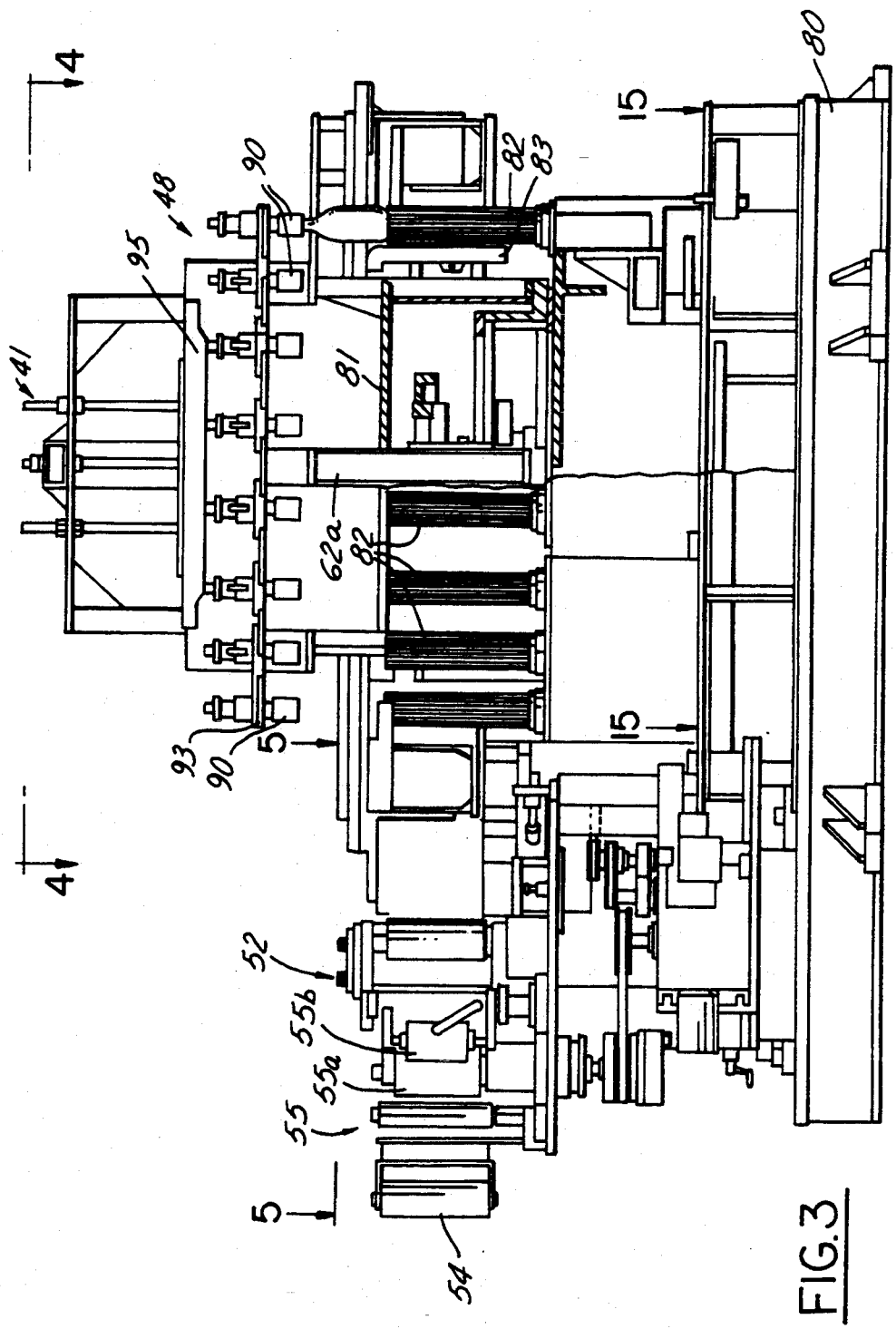
FIG. 3 is an elevational view taken along the line 3—3 in FIG. 1.

Referring to FIGS. 1-3, the apparatus embodying the invention comprises a conveyor 40 which is adapted to receive and carry containers such as glass containers to an apparatus 41 that form sleeves of thin shrinkable material and transfers the sleeves to the containers in sequence. Each sleeved container is delivered to conveyors 42, 43 and passed through an oven 44, such as an infrared oven, for shrinking the sleeves about the containers as the containers are moved through the oven by the conveyor 43. The apparatus optionally includes a preheating apparatus 45 upstream of apparatus 41 for preheating the containers on conveyor 40 where desired to facilitate application and/or shrinkage of the sleeves on the containers.

Figure 4:
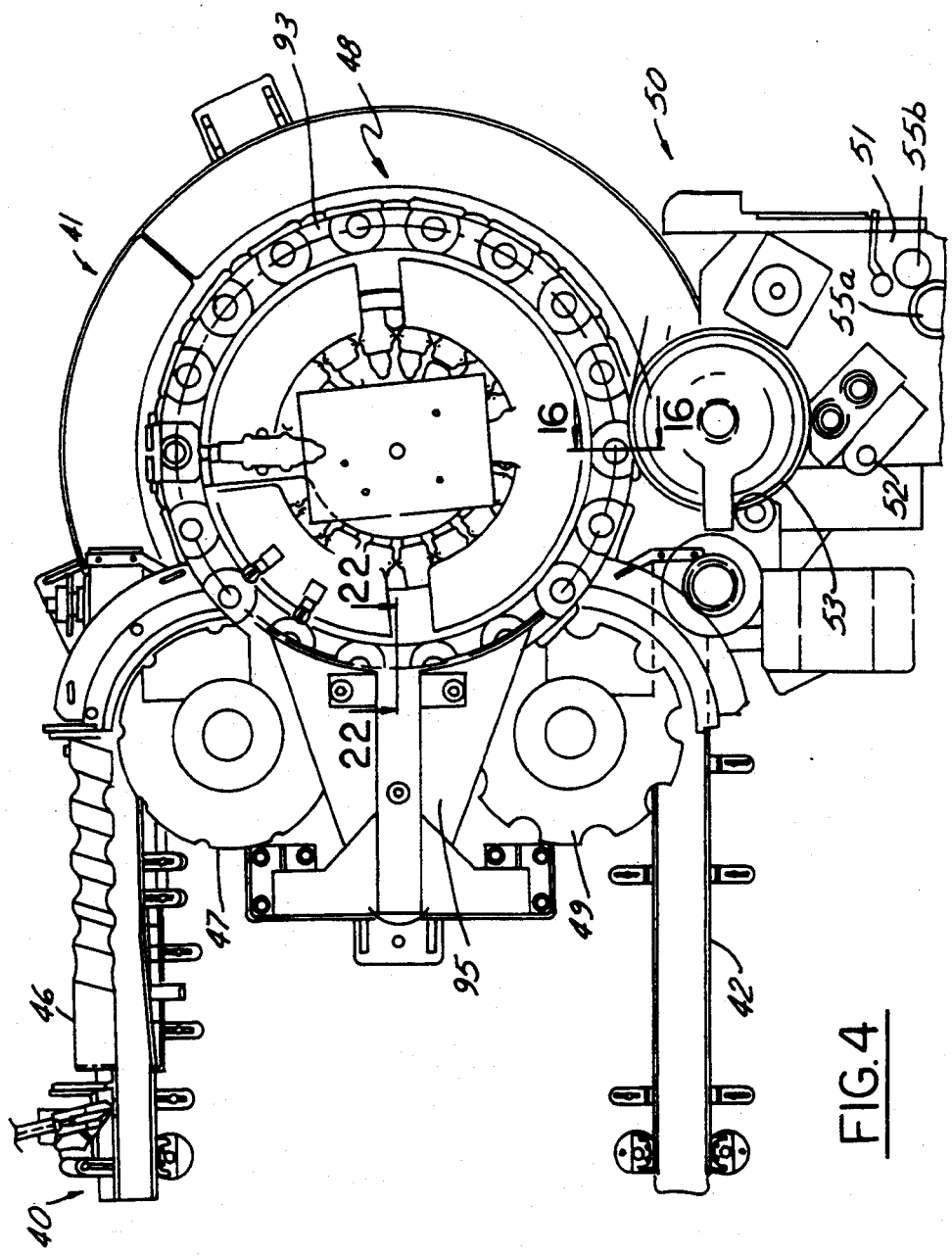
FIG. 4 is a fragmentary plan view on an enlarged scale taken along the line 4—4 in FIG. 3.
Figure 5:
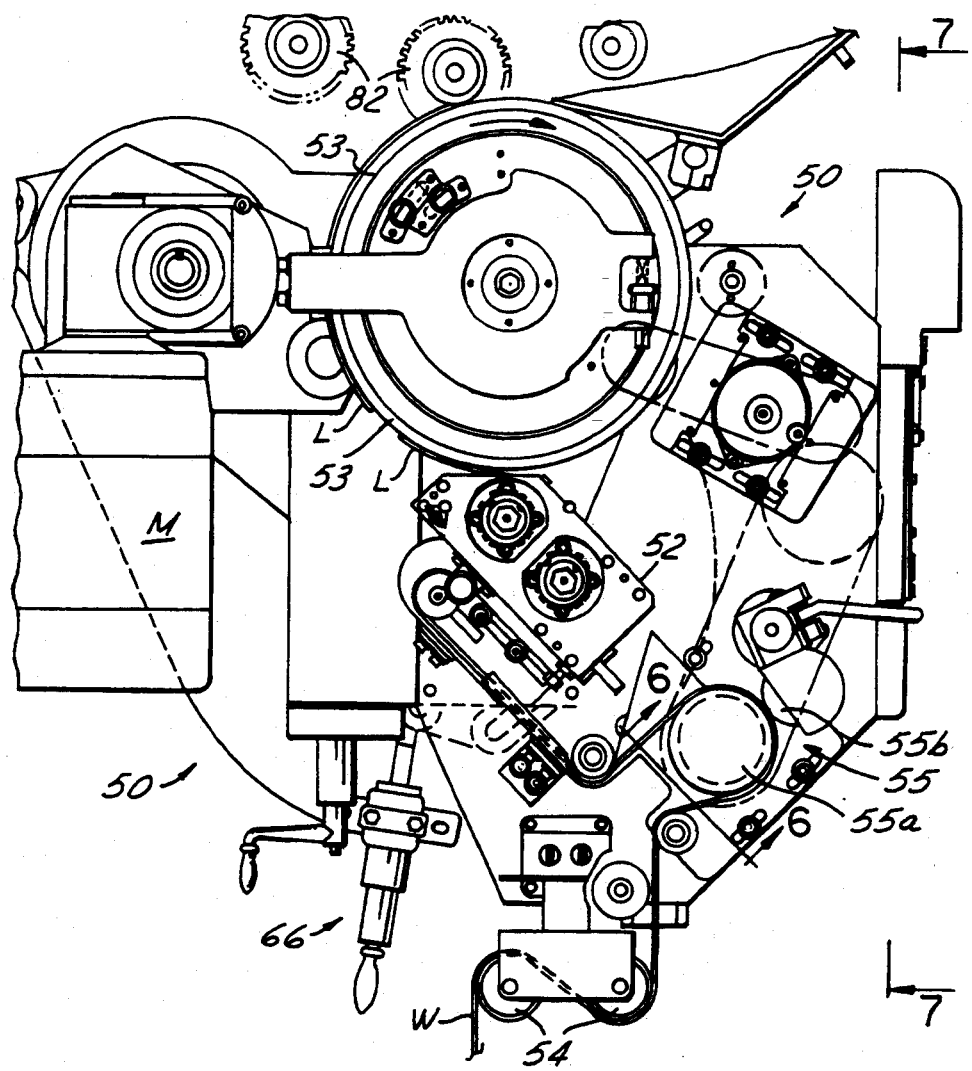
FIG. 5 is a fragmentary plan view on an enlarged scale taken along the line 5—5 in FIG. 3.
Figure 6:
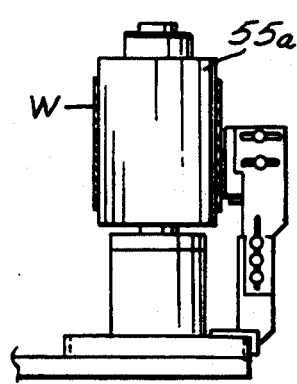
FIG. 6 is a sectional view taken along the line 6—6 in FIG. 5.

Referring to FIG. 4, the apparatus 41 includes an infeed worm conveyor 46 which functions to space the containers and deliver them to a starwheel 47, which in turn delivers the containers successively to a turret 48 so that the containers are moved in an arcuate path corresponding to the short arc of the turret 48 between infeed and outfeed starwheels 47, 49. As each container moves in the short path of the turret 48, a sleeve is transferred onto the container. Each container with a sleeve thereon is then transferred by a starwheel 49 onto the conveyor 42. A label feed and cutter apparatus 50 (FIGS. 4–13) is disposed beneath the level of turret 48. The label feed and cutoff apparatus 50 includes a feed mechanism 51 and a knife stand 52 that function to sever lengths of plastic web material W and deliver the severed lengths to a vacuum transfer drum 53. Web alignment rolls 54 function to align a web W of plastic material received from a source such as a roll, and to guide it between pinch rolls 55a, 55b to the knife stand 52. A motor M drives the knife stand 52 and the transfer drum 53.

Figure 7:
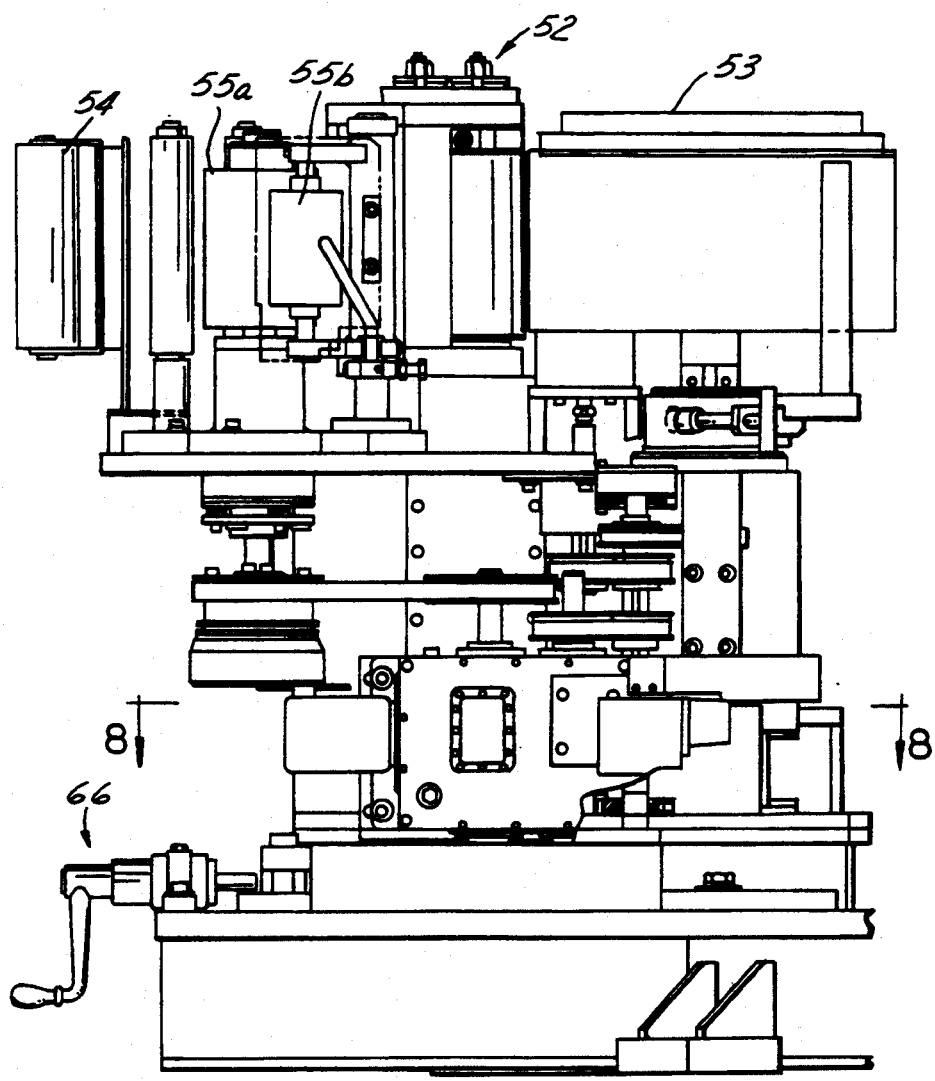
FIG. 7 is an elevational view, parts being broken away, taken along the line 7—7 in FIG. 5.
Figure 8:
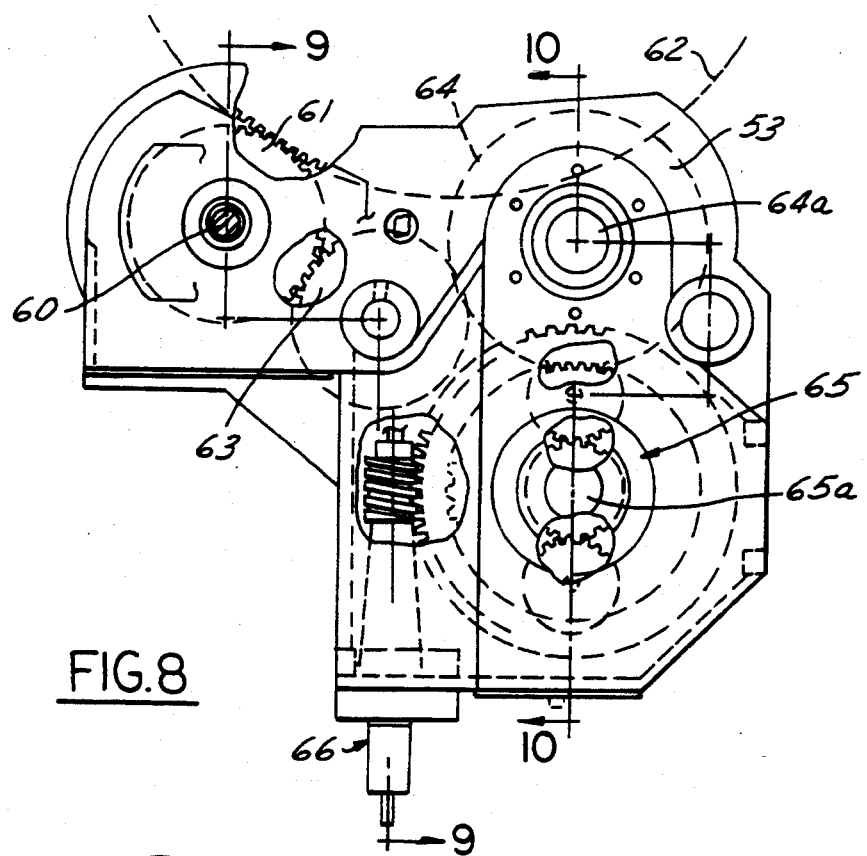
FIG. 8 is a part sectional view taken along the line 8—8 in FIG. 7.
Figure 9:
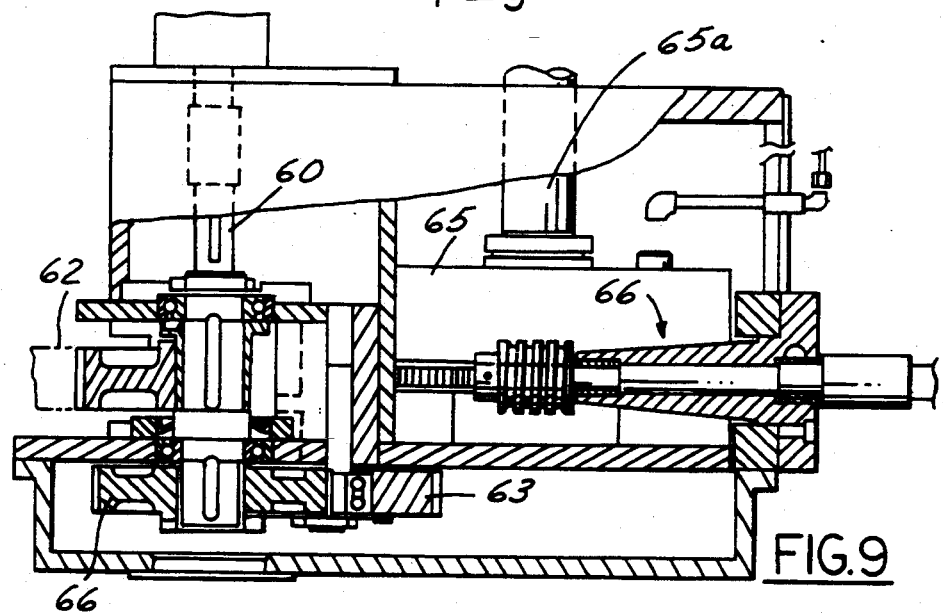
FIG. 9 is a sectional view taken along the line 9—9 in FIG. 8.
Figure 10:
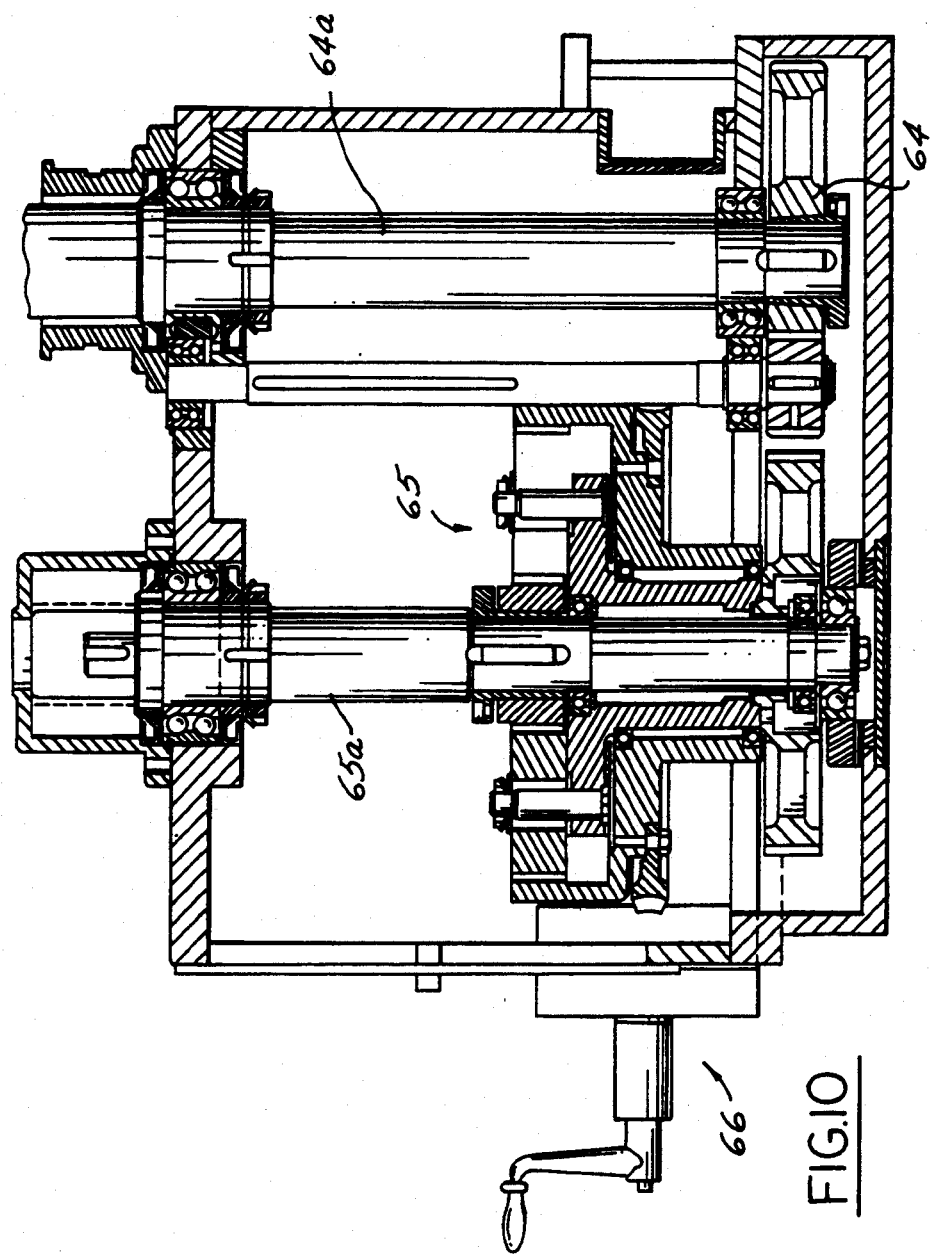
FIG. 10 is a sectional view taken along the line 10—10 in FIG. 8.

The motor M has a main drive shaft 60 (FIGS. 7–9). As shown in FIG. 8, the main drive shaft 60 drives a gear 61, which in turn is meshed with the main turret gear 62 of the container turret 48, as presently described. The main drive shaft 60 also functions through another gear 63 to drive a gear 64 coupled by the shaft 64a to the transfer drum 53. The main drive shaft 60 further functions to drive a set of planetary gearing 65 that are coupled by the shaft 65a to the knife stand 52 and a knife blade drum 71. This drive arrangement is essentially similar to that shown in above-referenced U.S. Pat. No. 3,843,316. An adjusting mechanism 66 is provided for changing the phasing of the drive of the knife stand 52 and transfer drum 53 to permit more accurate registry and to permit utilizing the same mechanism for sleeves of different lengths.

Figure 11:
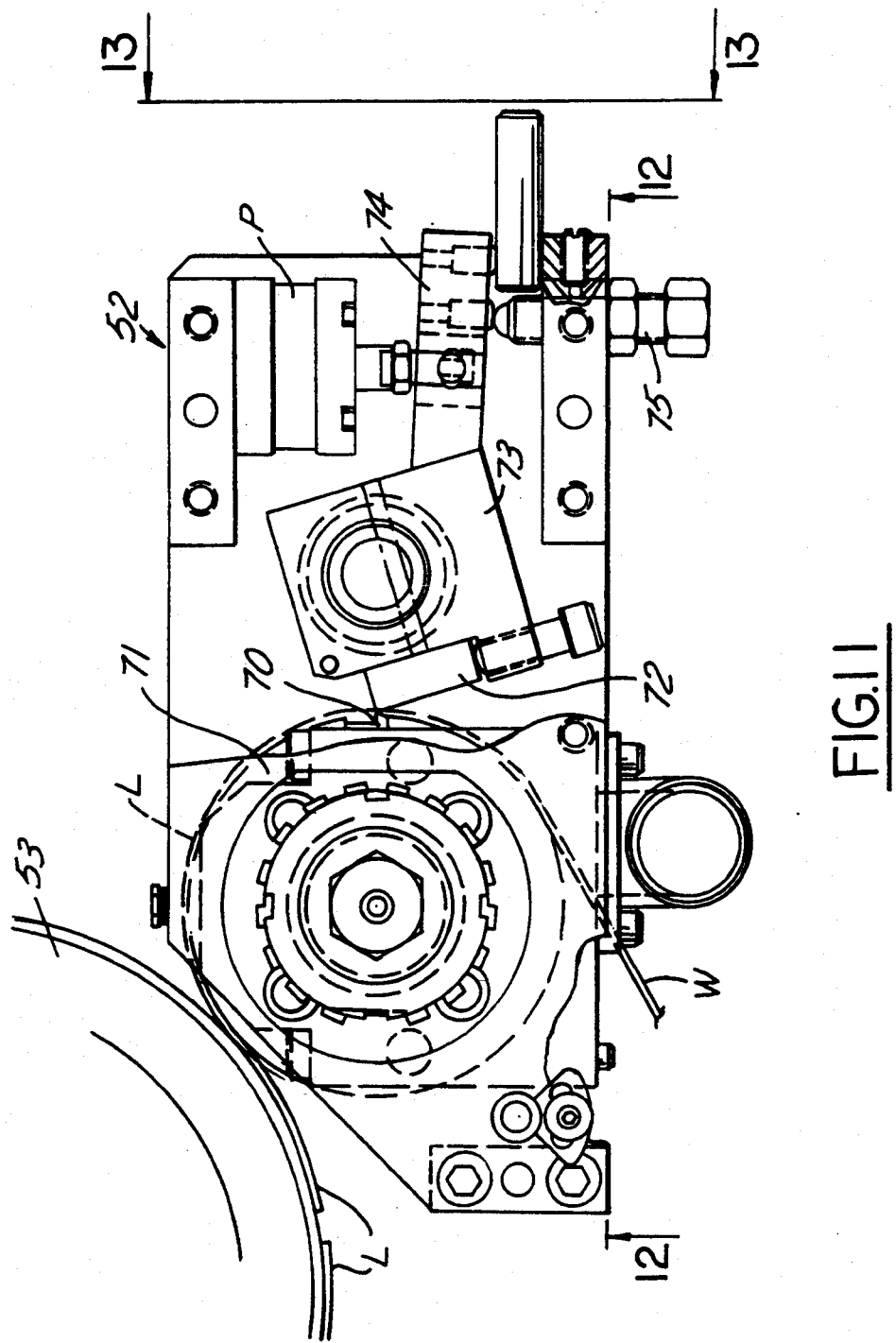
FIG. 11 is a part sectional view of a portion of the apparatus shown in FIG. 5, parts being broken away.
Figure 12:
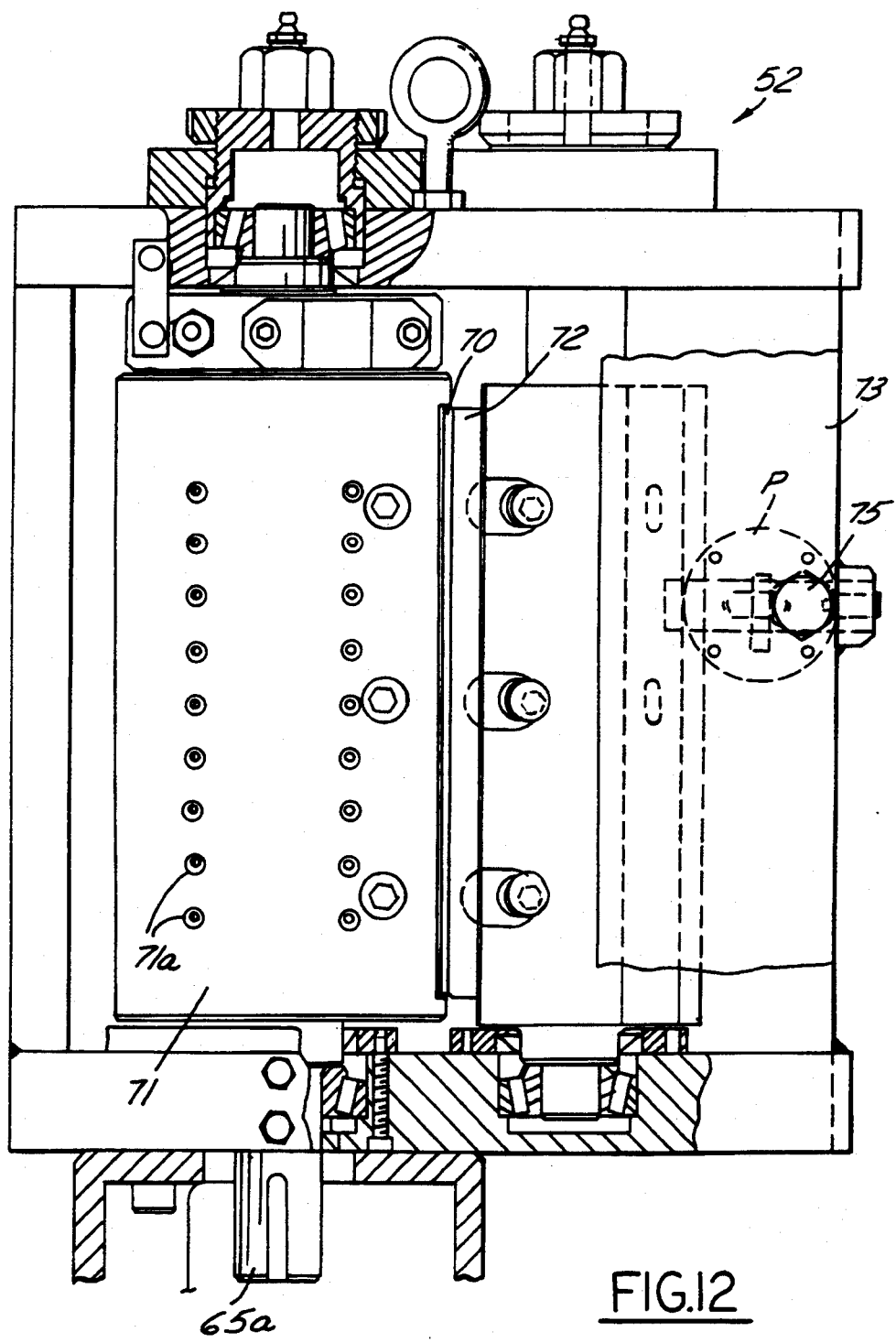
FIG. 12 is a part sectional view taken along the line 12—12 in FIG. 11, parts being broken away.
Figure 13:
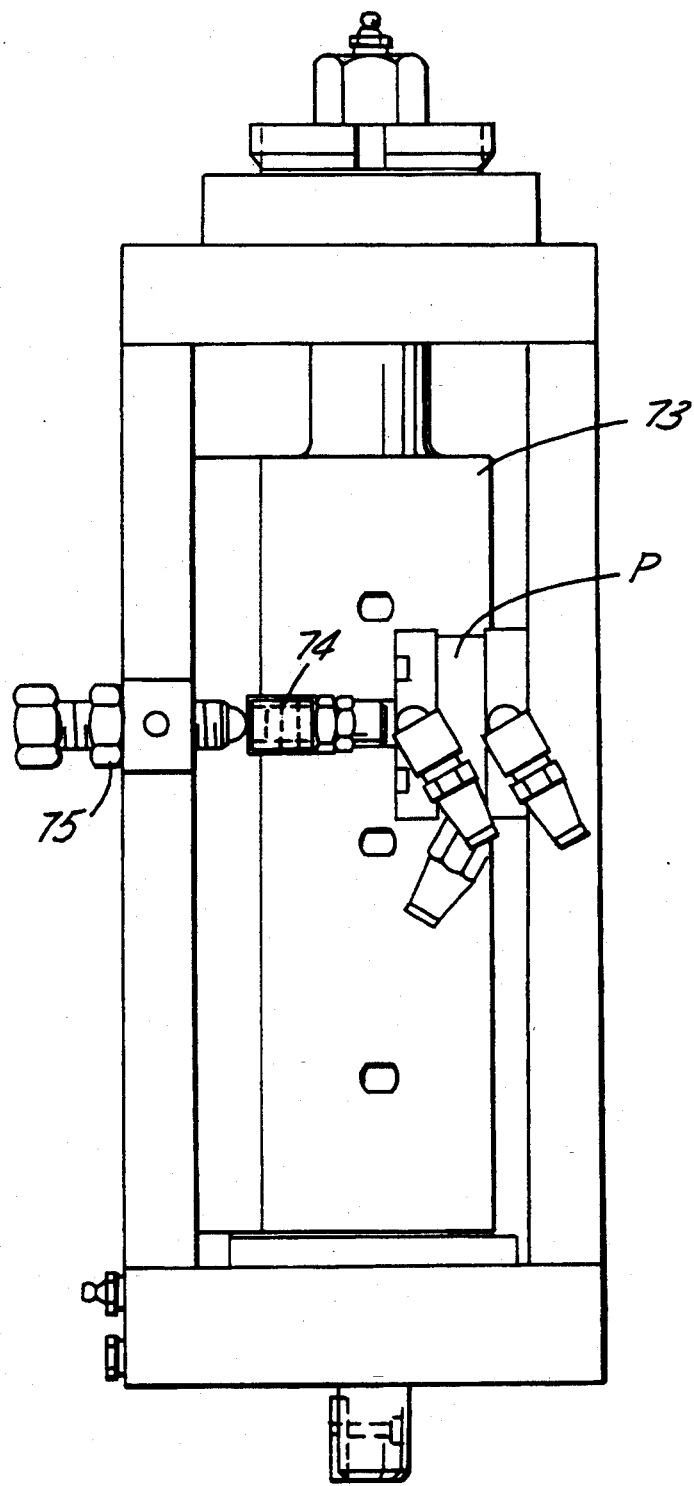
FIG. 13 is a fragmentary view taken along the line 13—13 in FIG. 11.

Referring to FIGS. 11–13, the knife stand 52 is of generally the same construction as that shown in above referenced U.S. Pat. No. 3,843,316. The knife stand 52 includes a rotating knife blade 70 on a knife blade drum 71 which functions against a stationary knife blade 72. During the movement of a length of web W about the knife blade drum 71 vacuum openings 71a retain the label L formed by severing after it has been severed and delivers it to the drum 53 (FIG. 11). The fixed knife blade 72 is mounted for movement into and out of position for cutting by an apparatus as shown in FIGS. 11–13. This includes a mounting block 73 on which the knife blade 72 is held in adjusted position. The block 73 includes a fixed operating lever 74 that is associated with a pneumatic motor P that oscillates the block and in turn the stationary knife blade 72 into and out of operating position. An adjustable stop 75 is provided.

Referring to FIGS. 2 and 3, a base 80 carries a rotating turret 81 that is beneath container turret 48 and is rotated conjointly and coaxially therewith by a shaft 62a coupled to gear 62 (FIG. 8). Turret 81 supports a plurality of circumferentially spaced splined rotatable mandrels 82. Each mandrel 82 has an associated individually controlled heat seal and tucker bar assembly 83 (FIGS. 16–22) that is carried by turret 81 radially inwardly adjacent to the associated mandrel. Each assembly 83 is moved radially toward and away from its associated mandrel as a severed length of plastic material is fed from the transfer drum 53 to a mandrel 82.

Figure 14:
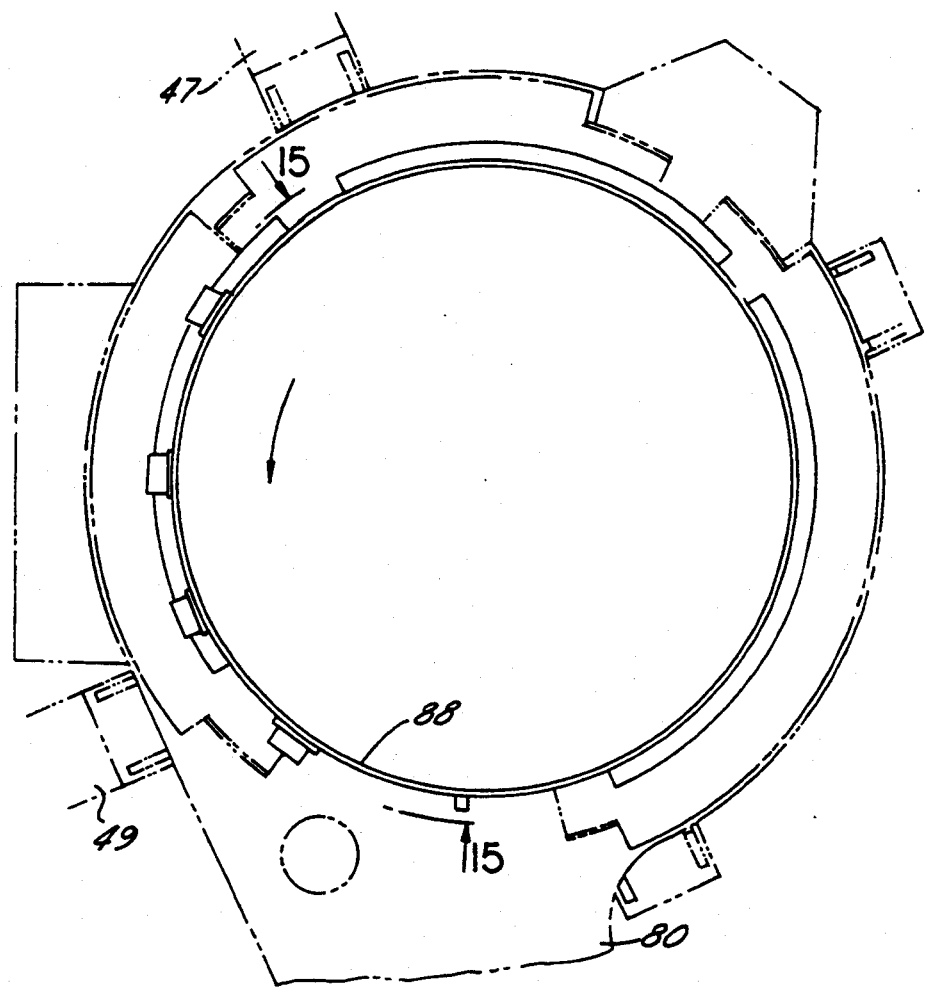
FIG. 14 is a plan view of a stripper cam.
Figure 15:
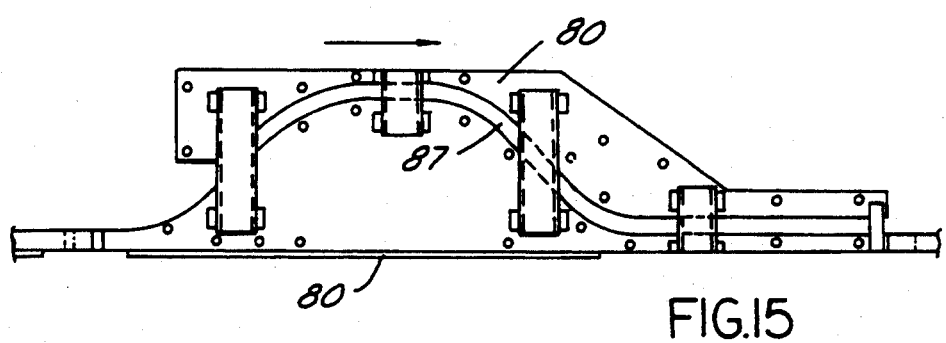
FIG. 15 is a view taken along the line 15—15 in FIG. 14.
Figure 16:
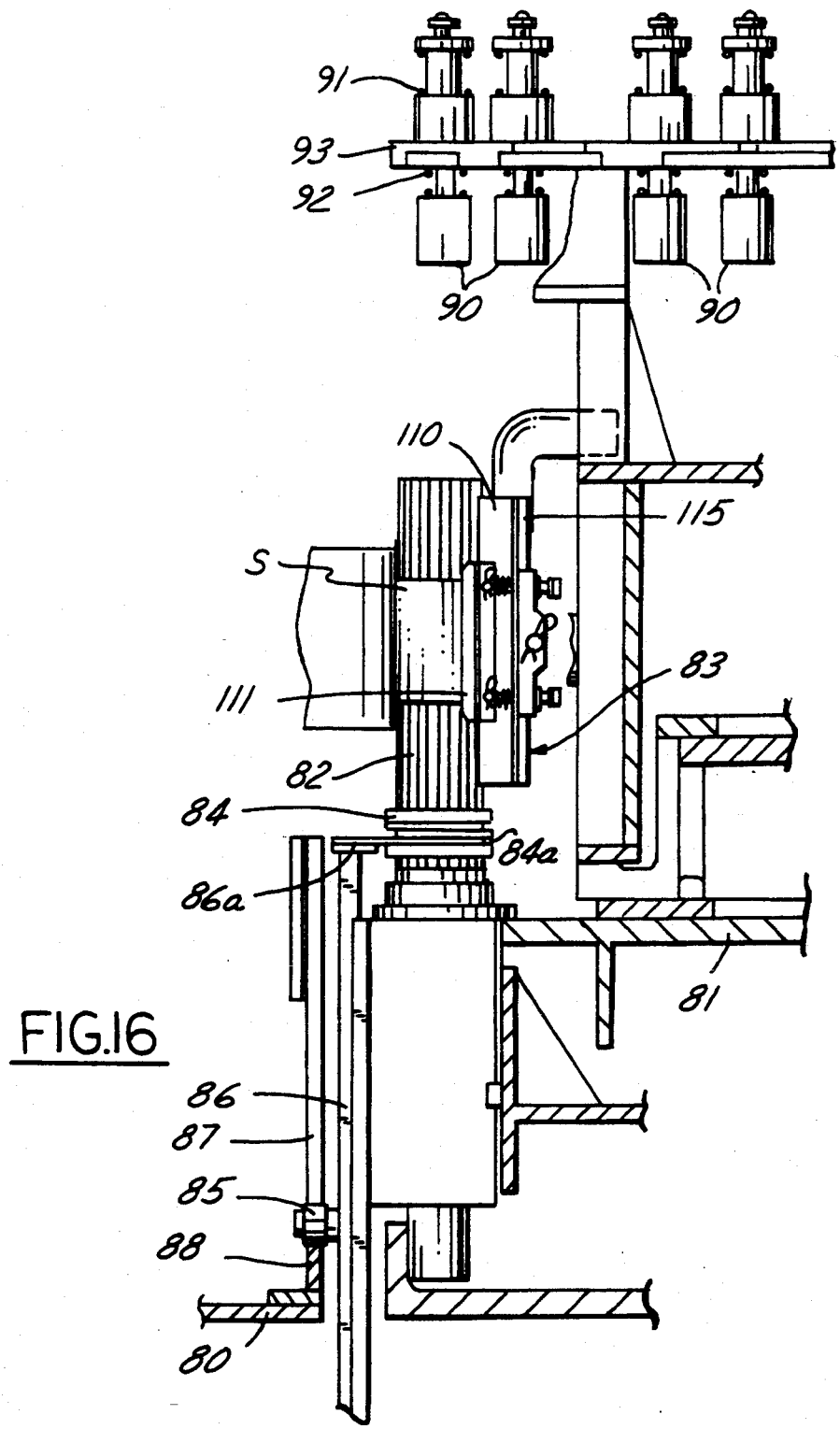
FIG. 16 is an elevational view taken along the line 16—16 in FIG. 4.
Figures 22, 23:
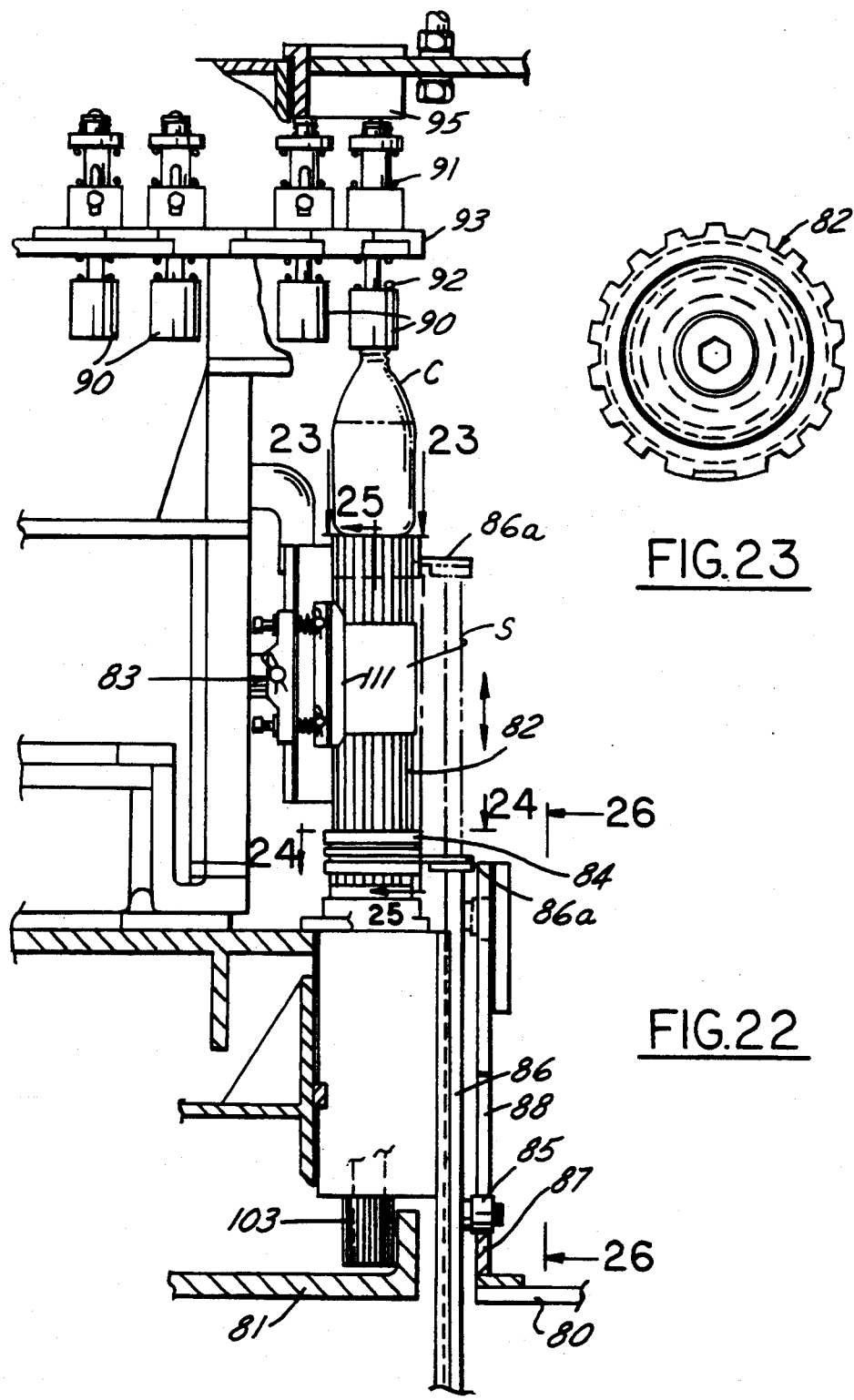
FIG. 22 is a sectional view taken along the line 22—22 in FIG. 4.
FIG. 23 is a plan view of a mandrel taken along the line 23—23 in FIG. 22.
Figure 31:
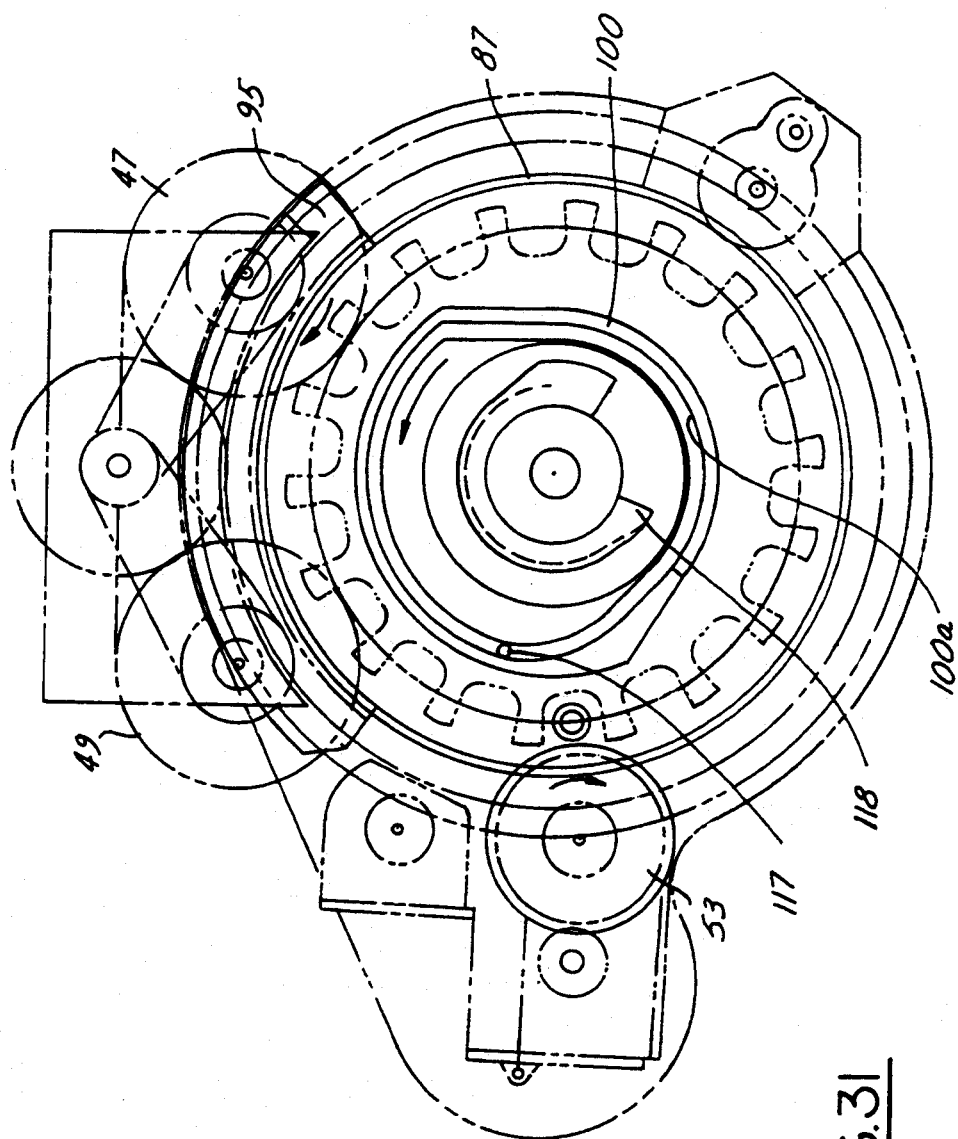
FIG. 31 is a diagram of movements of some of the parts during portions of rotation of the turret.

Referring to FIGS. 16—30, each mandrel 82 is slidably surrounded by an associated internally splined stripper ring 84 (FIGS. 16 and 22) which is movable upwardly and downwardly relative to the mandrel 82 to transfer a formed sleeve S from the mandrel onto an overlying container C (FIG. 22). Referring to FIGS. 14–16 and 22–25, each stripper ring 84 is moved vertically by a cam follower roller 85 that is connected to a bar 86 fixed to a plate 86a received in a channel 84a around ring 84. The cam follower rollers 85 engage a cam track 87 in an annular cam 88 (FIGS. 14, 15 and 31). Cam 88 is positioned beneath mandrel turret 81 coaxially therewith so as to define a circumferentially continuous path for follower rollers 85 as the turret rotates. The major portion of cam 88 is flat, and stripper rings 84 are normally disposed at the lower portions of mandrels 82, as shown in the drawings. However, between infeed starwheel 47 and outfeed starwheel 49 (FIGS. 4 and 14), cam track 87 rises, dwells and then falls (FIGS. 14–15) so as to urge follower rollers 85, bar 86, plate 86a and stripper rings 84 upwardly and then downwardly (by gravity) in sequence as turret 81 rotates. Cam-operated stripper arrangements of this general type are shown in above-referenced U.S. Pat. Nos. 3,843,316, 3,959,065 and 4,496,409.

Container turret 48, which corotates with mandrel turret 81, includes a circular platen 93. A circumferential array of chucks 90 slidably depend on shafts 90a beneath platen 93, one chuck 90 overlying and being coaxial with each mandrel 82. The upper end of each shaft 90a forms a cam follower that slidably engages an annular cam 95 that concentrically surrounds the turret axis of rotation. A coil spring is captured in compression between platen 93 and cam 95 to urge the cam followers upwardly against the cam. A second coil spring 92 is captured between platen 93 and each associated chuck to stabilize the chucks. Chucks 90 are driven by cam 95 essentially in opposition to stripper ring 84 between infeed starwheel 47 and outfeed starwheel 49 to hold sequential container C downwardly against associated mandrels 82 as finished sleeves S are stripped from the mandrels and moved onto the containers.

Figures 24, 25:
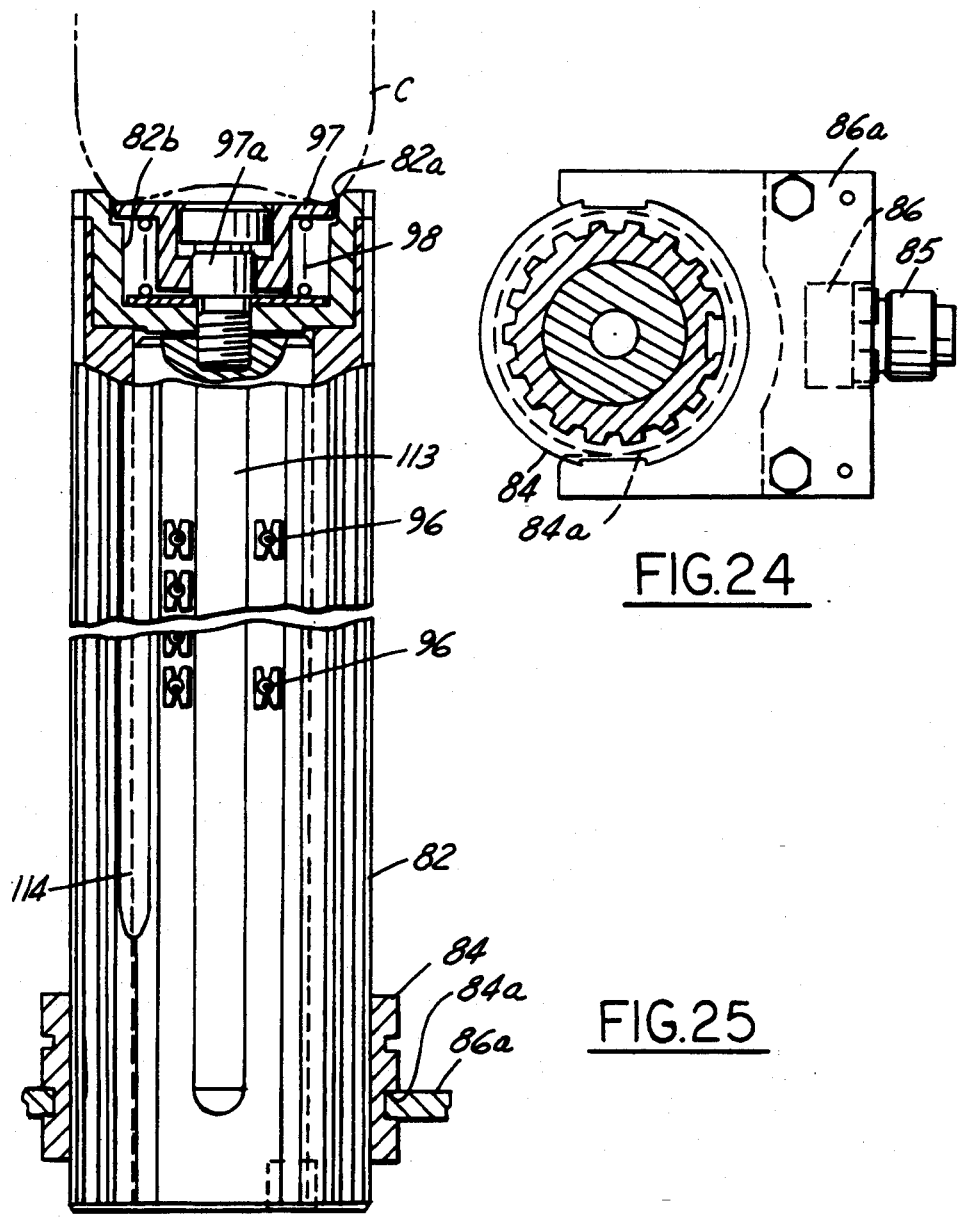
FIG. 24 is a sectional view taken along the line 24—24 in FIG. 22.
FIG. 25 is a fragmentary part sectional elevational view taken along the line 25—25 in FIG. 22.
Figures 29, 30:
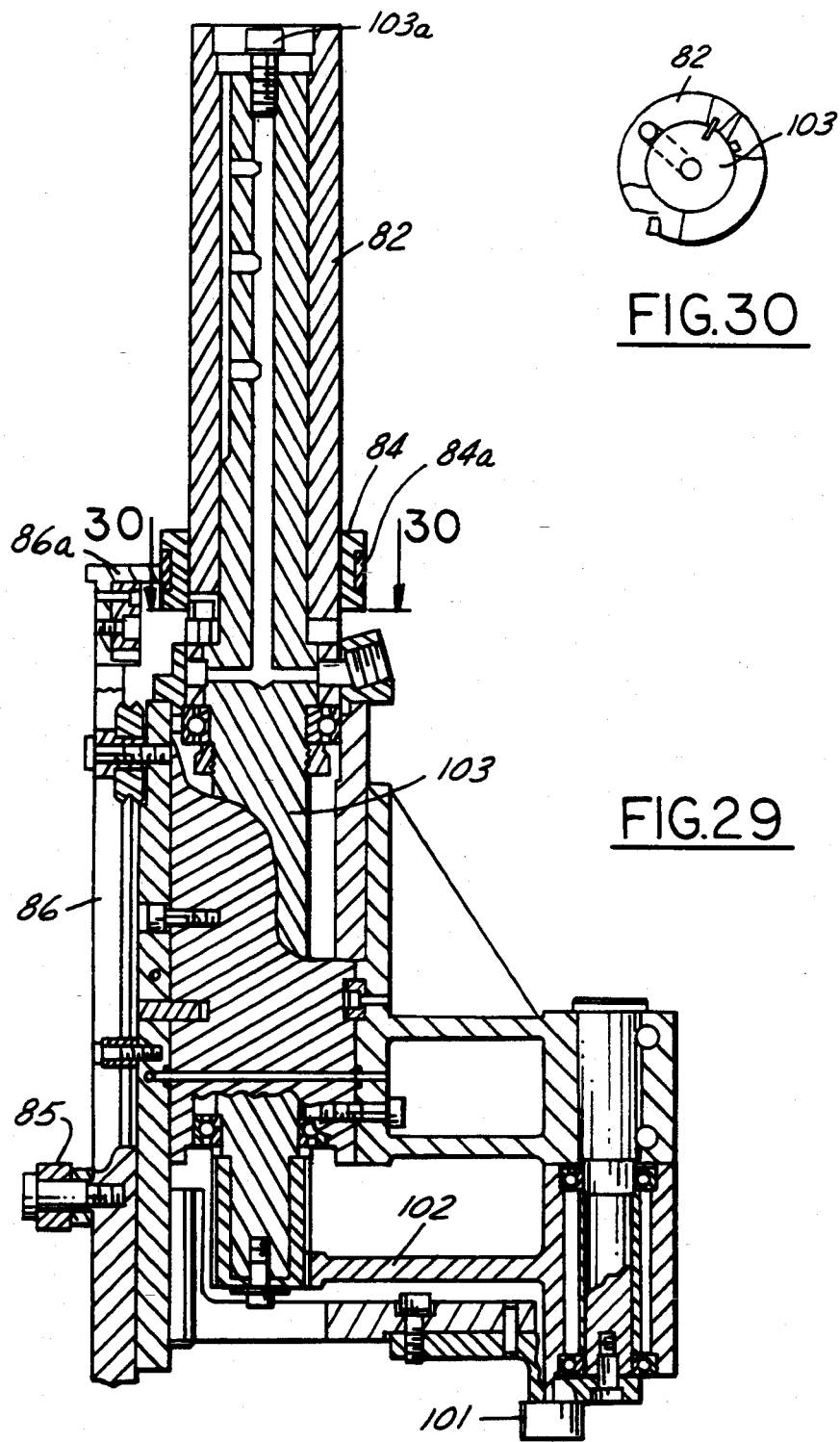
FIG. 29 is a sectional view taken along the line 29—29 in FIG. 26.
FIG. 30 is a sectional view taken along the line 30—30 in FIG. 29.

As shown in FIG. 25, each mandrel 82 has vacuum openings 96 to assist in the wrapping of the length of plastic material about the mandrel 82 and holding the material in place. Further each mandrel 82 has a pocket 82b at its upper end in which a spring loaded support pad 97 is disposed. Pad 97 is yieldingly urged upwardly by a coil spring 98 toward the associated chuck 90 (FIG. 22). Pad 97 cooperates with the conical geometry of the surrounding mandrel opening 82a to support and center the base of each container C as the sleeve S is transferred to the container S, chuck 90 holding container C downwardly against pad 97 and mandrel 82 against the force of spring 98, as shown in FIG. 25. Spring 98 assists and insures the transfer of the container C from the mandrel 82 outfeed starwheel 49. Each pad 97 is captured on its associated mandrel 82 by the head of a shoulder bolt 97a, with spring 98 being captured between pad 97 and the base of pocket 82b.

During the wrapping of a severed section L about each mandrel 82, the mandrel is rotated by the mechanism illustrated in FIGS. 24–31. Each mandrel 82 on turret 81 is clamped by a screw 103a to a rotatable shaft 103. Stripper ring 84 is rotatable with mandrel 82 because plate 86a is received in a groove 84a surrounding ring 84. Shaft 103 has a spine gear that engage a sector gear 102, which is pivoted by a cam roller 101 mounted on an arm 101a. Follower roller 101 engages a cam 100 (FIG. 31) that surrounds the axis of rotation of turrets 48, 81.

Figure 18:
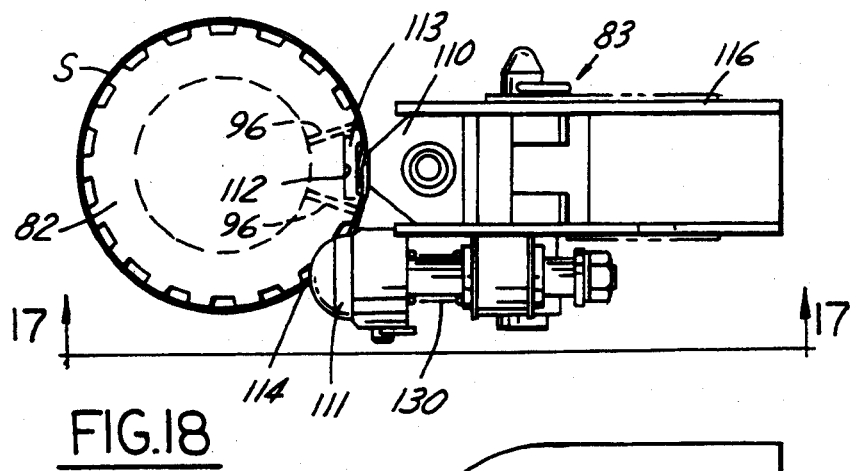
FIG. 18 is a fragmentary plan view of a portion of the apparatus shown in FIG. 17.
Figure 17:
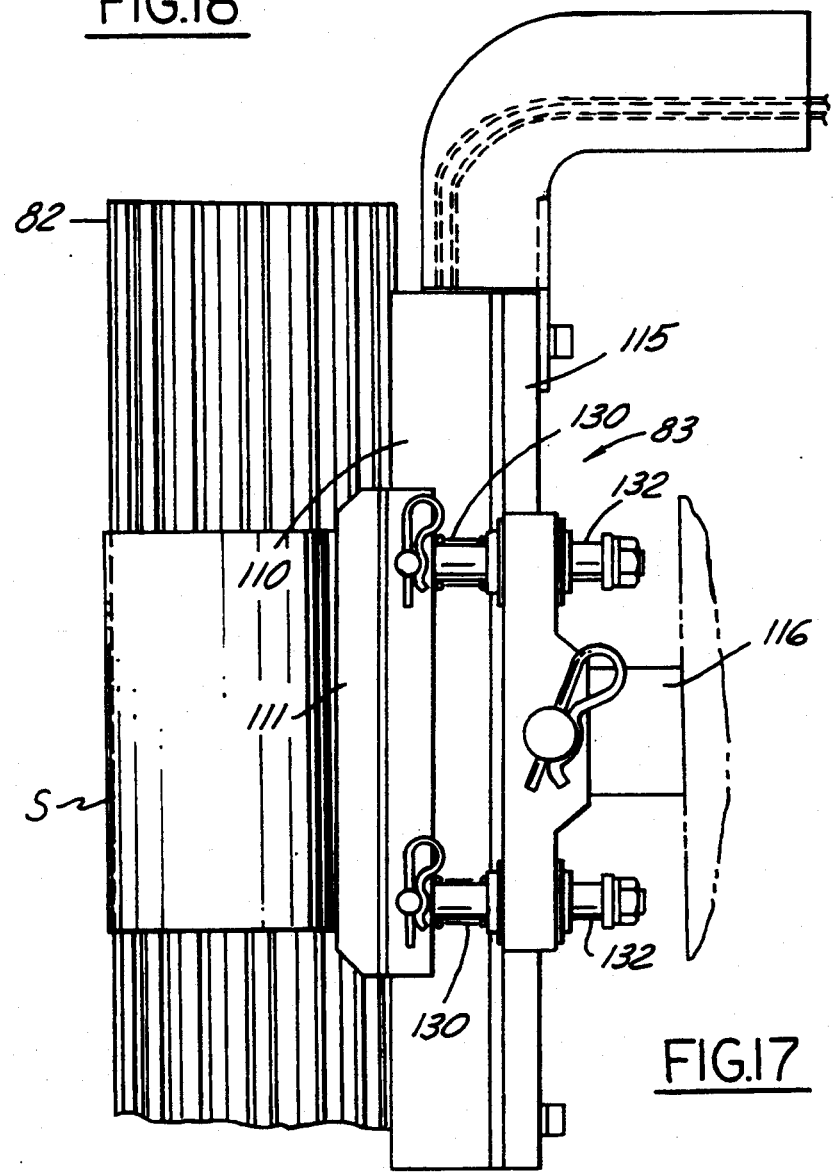
FIG. 17 is a part sectional view on an enlarged scale of a portion of the apparatus shown in FIG. 16.

Referring to FIGS. 16–25, each combined heat seal bar and tucker pad assembly 83 comprises a heated seal bar 110 and a laterally adjacent spring-loaded tucker pad 111. The seal bar 110 functions to seat the ends of the cut length or label to form a seal. The tucker bar 111 functions to remove any slack in the sleeve prior to sealing in order to facilitate the bonding of the overlapped ends. Upon completion of the sealing, removal of the tucker pad 111 provides a clearance or slack between the sleeve S and the mandrel 82 to facilitate the removal and transfer to a container. As shown in FIGS. 17, 18, each mandrel 82 includes a wide axially extending groove 112 for receiving a back-up pad 113 made of high temperature silicone rubber material. The back-up pad 113 is positioned circumferentially of mandrel 82 to oppose seal bar 110 when the seal bar is moved against the mandrel and sleeve carried by the mandrel to focus or confine heat generated by the heat seal bar at the overlap joint, and prevent heating of the mandrel. A wider axially extending groove 114 is spaced angularly of groove 112 for receiving tucker pad 111. Each seal bar 110 and its associated adjacent tucker bar 111 are mounted on axially extending body 115 which is pivoted about a horizontal axis on a support 116, which in turn is movable radially by a cam follower 117 thereon controlled by a cam track 118a in a cam 118 (FIGS. 19 and 31) provided in the path of the turret 81 in the area where a seal is to be made. Each tucker pad 111 is urged into engagement with the associated mandrel 82 by a pair of coil springs 130 captured in compression between the tucker pad and associated body 115. Thus, seal bars 110 are fixedly mounted on the associated segment 116, while each tucker bar 111 is radially slidable with respect thereto tangentially of the associated mandrel by means of the slide shafts 132.

Timing of operation of the apparatus is generally conventional. Beginning at outfeed conveyor 49 (FIG. 31) and moving counterclockwise, the mandrels are rotated and labels applied thereto by operation of winding cam 100. The welder and tucker bars are then moved by cam 118 into engagement with the labels on the mandrels, and the overlapped label ends are welded to each other. The welder bars are moved away from the mandrels as the mandrels reach infeed conveyor 47. Transfer cam 87 then operates to move the welded sleeves off of the mandrels onto the containers, in sequence, before reaching outfeed conveyor 49, where the process begins again.

We claim:

1. Apparatus for applying sleeves to containers that comprises:
   turret means having upper and lower turret sections that rotate conjointly about a fixed axis,
   infeed means and outfeed means angularly spaced from each other about said axis for feeding containers to and receiving containers from said upper turret section respectively,
   a circumferential array of angularly spaced mandrels carried on said lower turret section,
   a circumferential array of angularly spaced chucks carried on said upper turret section in alignment with said mandrels for engaging containers received from said infeed means in sequence and urging each individual container downwardly onto an associated mandrel,
   means on each said mandrel for engaging a container held thereagainst by an associated chuck for centering the container with respect to said mandrel,
   means for forming a sleeve on each said mandrel in sequence as said lower turret section moves through a first angular portion of a circular path around said axis, and
   means for transferring each said sleeve from an associated mandrel onto a container during a second angular portion of said path when the container is held against the mandrel by an associated chuck.

2. The apparatus set forth in claim 1 wherein said second angular portion of said path is of lesser angular dimension than said first angular portion of said path.

3. The apparatus set forth in claim 1 wherein said mandrels are of splined cylindrical construction.

4. The apparatus set forth in claim 1 further comprising circular cam means surrounding said axis and engaging said array of chucks to move said chucks in sequence downwardly to engage a container entering said upper turret section from said infeed means so as to urge the container against an opposing mandrel, and to move said chucks in sequence upwardly to disengage a container leaving said upper turret section to said outfeed means.

5. The apparatus set forth in claim 4 wherein said upper turret section includes a platen that rotates with said turret means, said chucks being mounted on said platen.

6. The apparatus set forth in claim 5 wherein said upper turret section includes spring means urging each said chuck away from the associated mandrel.

7. The apparatus set forth in claim 1 wherein said container-engaging means on each said mandrel comprises support means carried at an upper end of each said mandrel, and spring means on each said mandrel urging said support means toward an opposing chuck.

8. The apparatus set forth in claim 7 wherein said container-engaging means further comprises a pocket at an upper end of each said mandrel, said support means and said spring means being disposed in said pocket.

9. The apparatus set forth in claim 8 wherein said pocket has an open edge contoured to receive and center a container with respect to said support means and said mandrel.

10. The apparatus set forth in claim 1 wherein said means for forming a sleeve on each said mandrel comprises:
    means for depositing a length of strip stock on each said mandrel in sequence with opposed ends of each said length overlapped,
    means for engaging said length of strip stock on each said mandrel to remove slack from said stock, and
    means for bonding said overlapped ends of said length.

11. The apparatus set forth in claim 10 wherein said length-engaging means comprises a slot on each said mandrel and means disposed externally of each said mandrel for tucking strip stock into said slot.

12. The apparatus set forth in claim 11 wherein said tucking means comprises an array of tucker bars on said lower turret section each respectively adjacent to an associated said mandrel, and means for moving each said tucker bar into and out of engagement with strip stock on the adjacent mandrel.

13. The apparatus set forth in claim 12 wherein said bonding means comprises an array of heat seal bars on said lower turret section each respectively adjacent to an associated mandrel, and means for moving each said seal bar into and out of engagement with strip stock on the adjacent mandrel.

14. The apparatus set forth in claim 13 wherein each said mandrel includes means opposed to the associated heat seal bar when the heat seal bar engages the mandrel to focus heat from the heat seal bar at the overlapped ends of strip stock on the mandrel.

15. The apparatus set forth in claim 14 wherein each said mandrel further includes vacuum ports on both sides of said means opposed to said heat seal bar for holding the overlapped ends of said length.

16. The apparatus set forth in claim 13 wherein each said tucker bar is mounted in assembly with an associated said heat seal bar, said means for moving said tucker bar and said heat seal bar comprising means for moving both said bars conjointly into engagement with strip stock on an adjacent mandrel.

17. The apparatus set forth in claim 16 wherein said tucking means further comprises spring means resiliently urging each said tucker bar into pressing engagement with the adjacent mandrel.

18. The apparatus set forth in claim 17 wherein each said tucker bar is of elongated dimension lengthwise of the adjacent mandrel, said tucking means comprising means adjacent to spaced ends of the tucker bar slidably mounting each said tucker bar for movement tangentially of the adjacent mandrel, said spring means comprising coil springs surrounding each said slidably mounting means.

19. The apparatus set forth in claim 16 wherein each said heat seal bar engages the associate mandrel radially of the mandrel, and wherein each said tucker bar engages the mandrel tangentially of the mandrel.

20. The apparatus set forth in claim 16 herein said conjointly moving means comprises cam means surrounding said axis.

21. Apparatus for applying sleeves to containers that comprises:
    turret means having upper and lower turret sections that rotate conjointly about a fixed axis,
    infeed means and outfeed angularly spaced from each other about said axis for feeding containers to and receiving containers from said upper turret section respectively,
    a circumferentially array of angularly spaced mandrels carried on said lower turret section,
    means for forming a sleeve on each said mandrel in sequence as said lower turret section moves through a first angular portion of a circular path around said axis, and
    means for transferring each said sleeve from an associated mandrel onto a container during a second angular portion of said path,
    said sleeve-forming means comprising means for depositing a length of strip stock on each said mandrel with opposed ends of said length overlapped,
    means for bonding said overlapped ends to each other including heat seal means moveable against said mandrel and means on said mandrel opposed to said heat seal means for focusing heat at said overlapped ends and preventing heating of the mandrel, and
    means for engaging said length of strip stock on each said mandrel to remove slack from said stock, said length-engaging means comprising a slot on each said mandrel and means disposed externally of each said mandrel for tucking strip stock into said slot.

22. The apparatus set forth in claim 21 wherein said tucking means comprises an array of tucker bars on said lower turret section each respectively adjacent to an associated said mandrel, and means for moving each said tucker bar into and out of engagement with strip stock on the adjacent mandrel.

23. The apparatus set forth in claim 22 wherein said bonding means comprises an array of heat seal bars on said lower turret section each respectively adjacent to an associated mandrel, and means for moving each said heat seal bar into and out of engagement with strip stock on the adjacent mandrel.

24. The apparatus set forth in claim 23 wherein each said tucker bar is mounted in assembly with an associated said heat seal bar, said means for moving said tucker bar and said heat seal bar comprising means for moving both of said bars conjointly into engagement with strip stock on an adjacent mandrel.

25. The apparatus set forth in claim 24 wherein said tucking means further comprises spring means resiliently urging each said tucker bar into pressure engagement with the associated mandrel.

26. The apparatus set forth in claim 25 wherein each said tucker bar is of elongated dimension lengthwise of the adjacent mandrel, said tucking means comprising means adjacent to spaced ends of the tucker bar slidably mounting each said tucker bar for movement tangentially of the adjacent mandrel, said spring means comprising coil springs surrounding each said slidably mounting means.

27. The apparatus set forth in claim 26 wherein each said heat seal bar engages the associate mandrel radially of the mandrel, and wherein each said tucker bar engages the mandrel tangentially of the mandrel.

28. The apparatus set forth in claim 27 herein said conjointly moving means comprises cam means surrounding said axis.

29. The apparatus set forth in claim 21 further comprising a circumferntial array of angularly spaced chucks carried on said upper turret section in alignment with said mandrels for engaging containers received from said infeed means in sequence and urging each individual container downwardly onto an associated mandrel, and means on each said mandrel for engaging a contaienr held thereagainst by an associated chuck for centering the container with respect to said mandrel.

30. The apparatus set forth in claim 29 further comprising circular cam means surrounding said axis and engaging said array of chucks to move said chucks in sequence downwardly to engage a container entering said upper turret section from said infeed means so as to urge the container against an opposing mandrel, and to move said chucks in sequence upwardly to disengage a container leaving said upper turret section to said outfeed means.

31. The apparatus set forth in claim 30 wherein said upper turret section includes a platen that rotates with said turret means, said chucks being mounted on said platen.

32. The apparatus set forth in claim 31 wherein said upper turret section includes spring means urging each said chuck away from the associated mandrel.

* * * * *